United States Patent [19]

Stauffer et al.

[11] Patent Number: 5,100,543
[45] Date of Patent: Mar. 31, 1992

[54] WATER PURIFICATION SYSTEM FOR USE IN A LIVE BAIT TANK

[75] Inventors: Daryl R. Stauffer, Rte. 1, Box 107A, Clifton, Tex. 76634; Timothy L. Rendahl, Clifton; Charles E. Finney, Euless, both of Tex.

[73] Assignee: Daryl R. Stauffer, Claifton, Tex.

[21] Appl. No.: 313,223

[22] Filed: Feb. 21, 1989

[51] Int. Cl.⁵ ............................................. A01K 63/02
[52] U.S. Cl. ................................. 210/169; 210/220; 210/284; 210/287; 210/314; 210/416.2; 43/57
[58] Field of Search ............. 210/169, 416.2, 282–284, 210/287, 489, 220, 314; 43/57; 119/3, 5; 261/4-6, 121.2, DIG. 75

[56] References Cited

U.S. PATENT DOCUMENTS

| | | | |
|---|---|---|---|
| 2,605,901 | 8/1952 | Morrison et al. | 210/282 |
| 3,295,681 | 1/1967 | Rubert et al. | 210/489 |
| 3,904,393 | 9/1975 | Morse | 210/169 |
| 3,924,570 | 12/1975 | Lamonica | 210/169 |
| 4,077,877 | 3/1978 | Orensten | 210/169 |
| 4,196,081 | 4/1980 | Pavia | 210/283 |
| 4,427,548 | 1/1984 | Quick, Jr. | 210/169 |
| 4,693,820 | 9/1987 | Baxter | 210/287 |
| 4,713,173 | 12/1987 | Goldman et al. | 210/169 |
| 4,865,776 | 9/1989 | Campau | 119/3 |

Primary Examiner—W. Gary Jones
Assistant Examiner—Matthew O. Savage
Attorney, Agent, or Firm—Harry C. Post, III

[57] ABSTRACT

A system is used to remove the solid waste and gases excreted by a fish after being caught and deposited in water supported by a container and has a body. A filtering apparatus that removes the solid waste and gases excreted by the fish is connected to the body. A pumping device is connected to the body for continuously circulating the water supported within the container through the filter apparatus. If desired, an aerating device may be connected to said body for mixing air with the circulating water to provide oxygen to the fish supported in the container.

13 Claims, 2 Drawing Sheets

WATER PURIFICATION SYSTEM FOR USE IN A LIVE BAIT TANK

It is well known that for a fisherman to be successful, it is necessary for the fisherman to have the proper bait. To catch certain game fish, such as the stripper bass, it has been found that artificial lures are not as successful as live bait fish, such as gizzard-shad, hickory shad and thread fin shad. However, when a fisherman desires using shad as a bait fish for stripper bass as the game fish, the fisherman is required to catch the bait fish on the same day the fisherman goes fishing for the game fish because a bait fish, such as a seven to ten inch shad, will not survive more than twelve hours in a live bait tank with a density of more than one shad per gallon of water.

Thus, the bait fish must be caught and the fisherman or another person spends a substantial amount of time in catching the bait fish. When another person catches the live bait fish, the fisherman must pay a substantial price for the bait fish. When the fisherman catches the bait fish, his time is spent in catching the bait fish and traveling from one location to catch the bait fish and to another location to fish for the game fish. Since the time spent in this activity affects the amount of time the fisherman can fish that day, the fisherman must decide to use an artificial lure if he desires to fish all day or to spend less time fishing for the game fish and spend some time catching the bait fish.

One method devised to keep the bait fish alive, is the use of apparatus to aerate the water so that more oxygen is provided to the bait fish. Normally, this aerating apparatus continuously circulates some water from the live bait well and sprays the water over the water remaining in the well. However, such apparatus does not filter the solids and gases excreted by the fish in the live bait well and is not very successful.

Another method devised to keep the bait fish alive, is the treatment of the water in the live bait well either with chemicals or temperature adjusting techniques. Normally, these treatments are designed to prevent the bait fish from going into shock. For example, salt and/or ice is sometimes mixed with water in the well prior to adding the bait fish. Another example, is the use of a chemical that removes chlorine, removes copper, lowers ammonia and carbon dioxide, hardens skin and scales and reduces fungus, this chemical is sold by Jungle under the name Shiner Life. However, such methods have not been very successful because shad have only been kept alive for 1 day when the density of shad to water has been maintained at no more that a five to fourteen inch shad per five gallons of water.

Accordingly, it is an object of the present invention to allow the fisherman to catch the bait fish one day and use the bait the next day to fish for the game fish.

Further, it is an object of the present invention to continuously remove solid waste and gases from the water in a container, preferably, a live bait tank.

In accordance with the present invention, there is provided a system to continuously remove solid waste and gases excreted by a fish into a water in a container. The system comprises a body and filtering apparatus connected to the body for removing the solid waste and gases excreted by the fish. A pumping device is connected to the body for continuously circulating the water supported within the container through the filtering apparatus.

Further, in accordance with the present invention, there is provided a system used with a live bait tank to support a fish that excretes solid waste and gases after being caught. The system comprises a body and filtering apparatus connected to the body for removing the solid waste and gases excreted by the fish. A pumping device is connected to the body for circulating the water supported within the tank through the filtering apparatus. An aerating device is connected to the body for mixing air with the circulating water to provide oxygen to the fish supported in the tank.

Further, in accordance with the present invention, there is provided a method of maintaining a fish in a live bait tank. The method comprises the steps of providing a quantity of water in the live bait tank and circulating the water in the tank. The circulating water is aerated in the tank and filtered to remove any solid waste and gases excreted by a fish disposed within the tank to thereby prevent such excreted waste and gases to raise to a toxic level and kill the fish supported in the water contained in the tank.

Other objects and advantages of the invention will become apparent upon reading the following detailed description and upon reference to the drawings, wherein like reference characters are used throughout to designate like parts:

FIG. 1 a top perspective view of a system constructed in accordance with the present invention attached to a sign;

Figure 1:
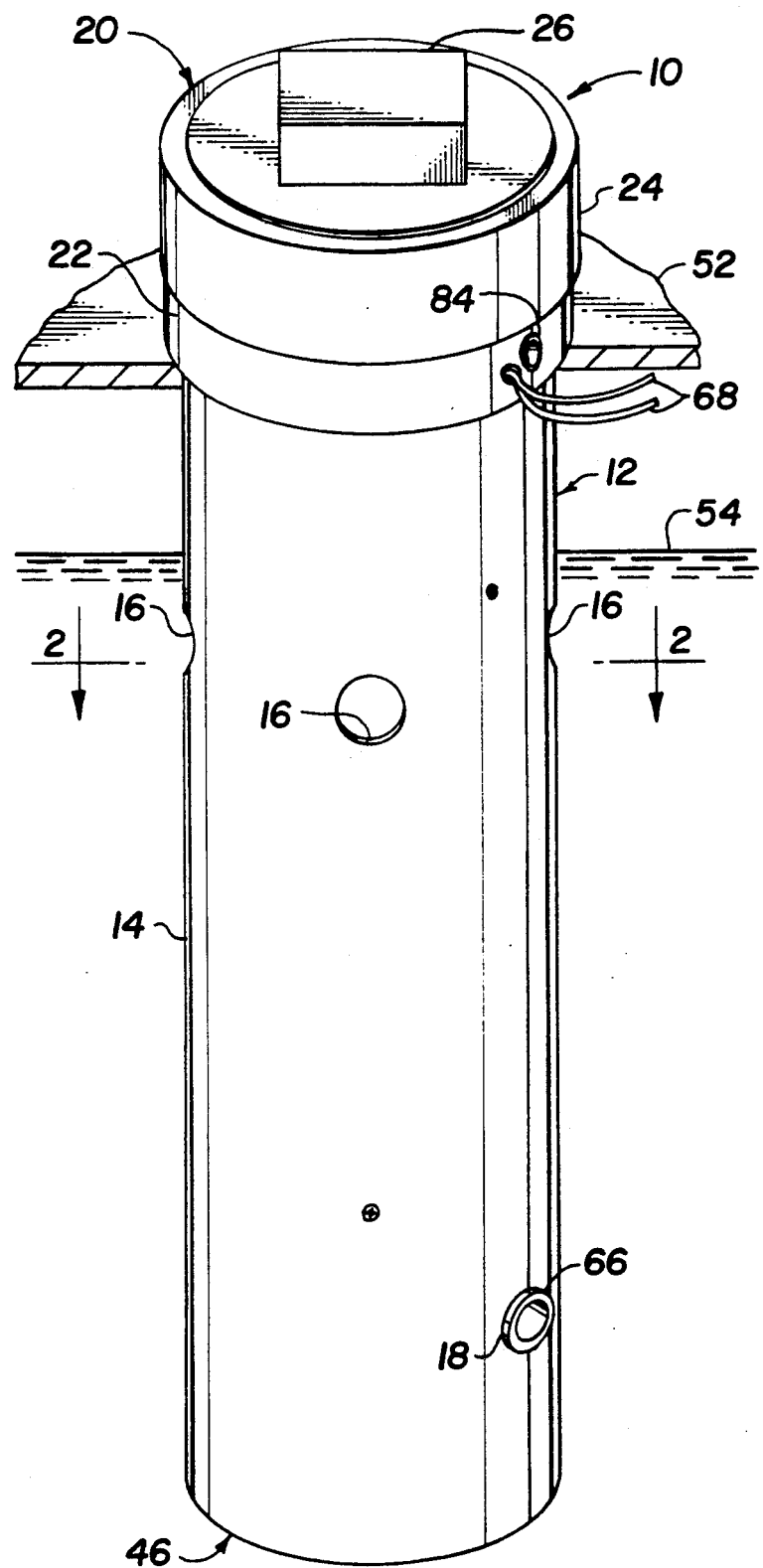
Figure 2:
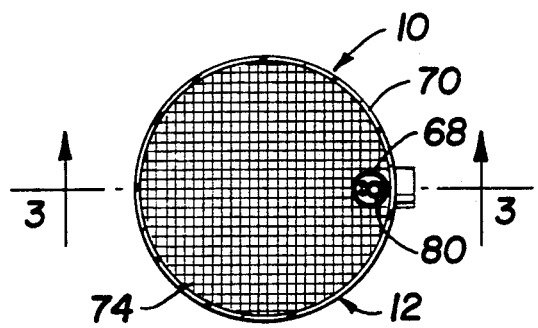
FIG. 2 is a sectional, plan view of the invention shown in FIG. 1 taken along the lines and in the direction of the arrows 2—2.
Figure 3:
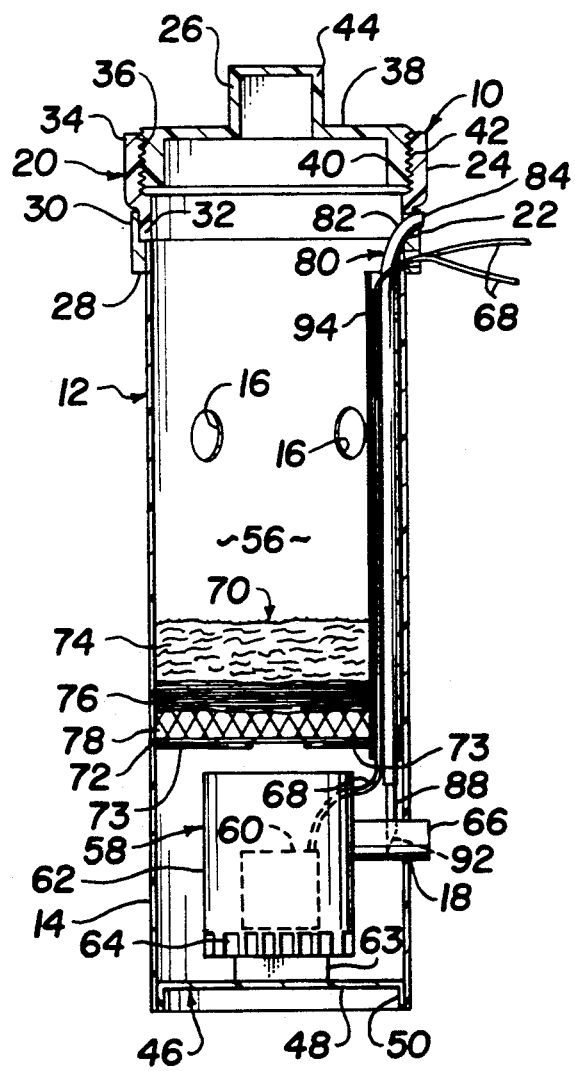
FIG. 3 is a sectional, side elevational view of the invention shown in FIG. 2, taken along the lines and in the direction of the arrows 3—3.

Turning to the drawing, there is shown in FIGS. 1-3, a system 10 constructed in accordance with the present invention.

System 10 comprises a body 12 that includes a tubular sleeve 14. Tubular sleeve 14 is elongated and cylindrical. Extending through sleeve 14 are inlet passageways 16 disposed at the same elevation and one outlet passageway 18 disposed at an elevation offset from the elevation of inlet passageways 16. Although four inlet passageways 16 are shown disposed equidistant from one another, if desired, additional passageways may be provided so as to allow sufficient water flow into body 12 to prevent cavitation of the water.

A top 20 is connected to a top portion of sleeve 14 and has a first concentric member 22 secured to the top end of sleeve 14, a second concentric member 24 secured to first concentric member 22 and a plugging member 26 threadedly connected to second concentric member 22. As best seen in FIGS. 1 and 3, first concentric member 22 includes a body portion 28 extending annularly around the end of and secured to sleeve 14 and a lip portion 30 extending away from body portion 28 and annularly around the end of sleeve 14. Second concentric member 24 includes an inturned lip portion 32 extending annularly inside of and secured to lip portion 30 and an outwardly turned lip portion 34 extending annularly around lip portion 30 with threads 36 provided on the interior of lip portion 34. Plugging member 26 includes a blocking wall 38 with a circular shape to extend transversely across outwardly turned lip portion 34 and an upturned shoulder 40 with threads 42 provided thereon to engage with threads 36 provided on lip portion 34. If desired, a bolt head portion 44 may be provided on blocking wall 38 for rotating plugging member 26 relative to second concentric member 24 for threaded connection.

A bottom 46 is connected to sleeve 14. Bottom 46 includes a blocking portion 48 having a circular portion adapted to fit inside of and transversely across sleeve 14 and a shoulder portion 50 disposed to extending axially along and to the outboard end of sleeve 14.

When desired to place body 12 within a container holding water to support a bait fish, body 12 is disposed through an opening in a lid 52 of such container so that inlet passageways 16 are below water line 54. This arrangement will place a chamber 56 defined by top 20, bottom 46 and sleeve 14 in fluid communication with the water through inlet passageways 16 and outlet passageway 18.

A pumping device 58 is connected to body 12 for circulating the water supported within the container. Pumping device 58 is submersible and disposed within chamber 56 in body 12 in close proximity to bottom 46. Pumping device 58 has an electrically powered pump 60, a housing 62 supported on spacer 63 supported on blocking portion 48 of bottom 46, a water inlet 64 provided in the lower portion of housing 62, and a water outlet 66 extending through outlet passageway 18 in sleeve 14. It is desired that the water is circulated through the tank at a rate sufficient to agitate and maintain the solid waste in suspension in the water within the tank until filtered from the circulating water. A pump that works well in a live bait tank adapted to support of 15 to 100 gallons of water is a bilge pump sold by Rule with model 24 having a flow rate of 360 gallons per hour. Another bilge pump sold by Rule also works well and this pump has model number 25 with a flow rate of 500 gallons per hour. Electrical conductor 68 are connected to body 12 for supplying electrical power to pump 60.

As best seen in FIGS. 2 and 3, a filtering apparatus 70 for removing the solid waste and gases excreted by the fish is connected to body 12 in system 10 by placing on a screen 72, which is connected to and disposed transversely across sleeve 14 by four pins 73 extending radially from sleeve 14 between housing 62 and inlet passageways 16. Filtering apparatus 70 includes a first porous body 74 adapted to remove the solid waste from the circulating water. It is preferred that first porous body 74 is a material of loosely woven plastic wire, such as that sold under the name Chore Girl. A second porous body 76 adapted to remove carbon dioxide from the circulating water is included in filtering apparatus 70. Second porous body 76 may be a filter cartridge of super activated carbon, such as that sold by Aquarium Pharmaceuticals Inc. under the name Black Magic Filter Cartridges. A third porous body 78 adapted to remove ammonia from the circulating water is included in filtering apparatus 70. Third porous body 78 may be a filter pad of zeolite resin adhered to a polyester pad, such as that sold by Aquarium Pharmaceuticals Inc. under the name Ammo-pad. If desired, second porous body 78 may be a flow through bag of an ammonia removing resin, such as that sold by Aquarium Pharmaceuticals Inc. under the name Ammo-chip Hydropouch, and third porous body 78 a filter cartridge of super activated carbon, such as that sold by Aquarium Pharmaceuticals Inc. under the name Black Magic Filter Cartridges. When this configuration is used, screen 72 may be eliminated and third body 78 supported by pins 73.

Figure 4:
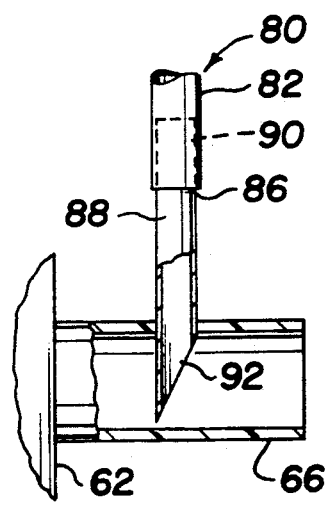
FIG. 4 is an enlarged sectional view of a portion of the aerating apparatus used in the invention shown in FIG. 1.

As best seen in FIGS. 1, 3 and 4, an aerating device 80 is connected to body 12 for mixing air with the circulating water to provide oxygen to the fish supported in the tank. Included in aerating device 80 is a first tubular member 82 having an inlet end 84 placing the interior in fluid communication with the ambient atmosphere and an outlet end 86. A second tubular member 88 is included in aerating device 80 and has an inlet end 90 connected at outlet end 86 to first tubular member 82 and an outlet end 92 connected to water outlet 66 of pumping device 58 so that air is drawn from the atmosphere through first tubular member 82 and second tubular member 88 and mixed with the circulating water. As seen in FIG. 4, outlet end 92 is cut on a taper so as to aid in drawing the air from the atmosphere and mixing with the circulating water as the water flows out of water outlet 66 of pumping device 58.

If desired, a tube 94 may be installed to extend longitudinally along the wall of sleeve 14 to support electrical conductors 68 of pumping device 58 and first tubular member 82 of aerating device 80 together, which will prevent interference when cleaning or replacing filtering apparatus 70.

In operation, a hole is cut through lid 52 in the live bait tank and system 10 is positioned over hole and lowered into the tank with bottom 46 being at the lower most point. A sufficient quantity of water is provided in the live bait tank so that inlet passageways 16 are covered by water. The water is then treated with a chemical to remove chlorine, copper, lower ammonia and carbon dioxide, harden skin and scales of the bait fish and reduce fungus and a chemical to reduce foaming of the water. Pumping device 58 is connected to an electrical power supply of twelve volts by conductors 68 and activated to continuously circulate the water in the tank. As the water flows from outlet 66 of pumping device 58, air is drawn through aerating device 80 from the atmosphere and mixed with the circulating water flowing into the tank. After the circulating water flows through inlet passageways 16 into chamber 56, the circulating water is filtered to remove any solid waste and gases excreted by a fish disposed within the tank as it passes through filtering apparatus 70. Such filtering removes and prevents the excreted waste and gases to raise to a toxic level and kill the fish supported in the water contained in the tank. In the event filtering apparatus 70 becomes blocked from solids, the suction of air through first tubular member 82 will provide sufficient noise for a person near system 10 to hear, a person may then correct the problem by turning off pumping device 58, unscrewing plugging member 26 from second concentric member 24, taking first porous material 74 out of sleeve 14, washing first porous material 74, returning first porous material 74 to its position on second porous material 76, screwing plugging member 26 into second concentric member 24 and turning on pumping device 58. It has been found that using this apparatus and method, one shad of between ten and fourteen inches in length for every gallon of water in a live bait tank has been kept alive for a period of at least two weeks.

The invention having been described, what is claimed is:

1. A system used to continuously remove solid waste and gases excreted by a fish into water, comprising: a container adapted to support the fish and water; a body adapted to be connected to said container, defining a chamber and including an inlet passageway placing the chamber in fluid communication with the water supported in said container and an outlet passageway placing the chamber in fluid communication with the water in said container; filter means connected to said body for removing the solid waste and gases excreted by the fish; and pump means connected to said body for continuously circulating the water supported within said container through said filter means, said pump means being disposed within the chamber in said body and having a housing with a water inlet and a water outlet; said filter means being disposed within the chamber in said body between the inlet passageway included in said body and the water inlet in the housing of said pump means.

2. A system as set forth in claim 1, further comprising: aerating means connected to said body for mixing air with the circulating water to provide oxygen to the circulating water.

3. A system as set forth in claim 2, further comprising: said aerating means including a first tubular member disposed in fluid communication with the ambient atmosphere and a second tubular member connected to the first tubular member and disposed in fluid communication with the circulating water so that air is drawn from the atmosphere through the first and second tubular members and mixed with the circulating water.

4. A system as set forth in claim 1, further comprising: said body including a sleeve, a top connected to the sleeve, a bottom connected to the sleeve, an inlet passageway provided through the sleeve to place the chamber, which is defined by the top, bottom and sleeve in fluid communication with the water, and an outlet passageway provided through the sleeve to place the chamber in fluid communication with the water.

5. A system used to continuously remove solid waste and gases excreted by a fish into water, comprising: a container adapted to support the fish and the water; a body adapted to be connected to said container; filter means connected to said body for removing the solid waste and gases excreted by the fish; and pump means connected to said body for continuously circulating the water supported within the container through said filter means; said body including a sleeve, a top connected to the sleeve, a bottom connected to the sleeve, an inlet passageway provided through the sleeve to place a chamber defined by the top, bottom and sleeve in fluid communication with the water, and an outlet passageway provided through the sleeve to place the chamber in fluid communication with the water; said pump means being submersible and disposed within the chamber in said body in close proximity to the bottom, said pump means having an electrically powered pump, a housing with a water inlet and a water outlet, and means connected to said body for supplying electrical power to the pump; said filter means disposed within the chamber in said body between the inlet passageway and the water inlet in the housing of said pump means; and aerating means connected to said body for mixing air with the circulating water to provide oxygen to the circulating water, said aerating means having an outlet disposed between the water outlet in the housing of said pump means and the outlet passageway in said body.

6. A system as set forth in claim 5, further comprising: said aerating means including a first tubular member disposed in fluid communication with the ambient atmosphere and a second tubular member connected to the first tubular member and disposed in fluid communication with the circulating water so that air is drawn from the atmosphere through the first and second tubular members and mixed with the circulating water.

7. A system as set forth in claim 5, further comprising: said filter means including a porous body having a material adapted to remove the solid waste from the circulating water; a porous body having a material adapted to remove carbon dioxide from the circulating water; and a porous body having a material adapted to remove ammonia from the circulating water.

8. A system to support a fish that excretes solid waste and gases into water after being caught, comprising: a live bait tank adapted to support the fish and water; a body adapted to be connected to said tank, defining a chamber and including an inlet passageway placing the chamber in fluid communication with the water in said tank and an outlet passageway placing the chamber in fluid communication with the water in said tank; filter means connected to said body for removing the solid waste and gases excreted by the fish; pump means connected to said body for circulating the water supported within said tank through said filter means; and aerating means connected to said body for mixing air with the circulating water to provide oxygen to the fish supported in the tank, said pump means being disposed within the chamber in said body and having a housing with a water inlet and a water outlet; said filter means being disposed within the chamber in said body between the inlet passageway included in said body and the water inlet in the housing of said pump means.

9. A system as set forth in claim 8, further comprising: said aerating means including a first tubular member disposed in fluid communication with the ambient atmosphere and a second tubular member connected to the first tubular member and disposed in fluid communication with the circulating water so that air is drawn from the atmosphere through the first and second tubular members and mixed with the circulating water.

10. A system as set forth in claim 8, further comprising: said body including a sleeve, a top connected to the sleeve, a bottom connected to the sleeve, an inlet passageway provided through the sleeve to place the chamber defined by the top, bottom and sleeve in fluid communication with the water in said tank when the bottom of said body is disposed within said tank, and an outlet passageway provided through the sleeve to place the chamber in fluid communication with the water within said tank when the bottom of said body is disposed in said tank.

11. A system used to support a fish that excretes solid waste and gases after being caught, comprising: a live bait tank adapted to support the fish and water; a body adapted to be connected to said tank; filter means connected to said body for removing the solid waste and gases excreted by the fish; pump means connected to said body for circulating the water supported within said tank through said filter means; and aerating means connected to said body for mixing air with the circulating water to provide oxygen to the fish supported in said tank; said body including a sleeve, a top connected to the sleeve, a bottom connected to the sleeve, an inlet passageway provided through the sleeve to place a chamber defined by the top, bottom and sleeve in fluid communication with the water in the tank when the bottom of said body is disposed within the tank, and an outlet passageway provided through the sleeve to place the chamber in fluid communication with the water within the tank when the bottom of said body is disposed in the tank; means for connecting said body to said tank when the bottom is disposed in said tank; said pump means being submersible and disposed within the chamber in said body in close proximity to the bottom, said pump means having a twelve volt direct current electrically powered pump, a housing with a water inlet disposed in fluid communication with the water in the chamber and a water outlet disposed in fluid communication with the water in said tank, and means connected to said body for supplying a twelve volt direct current to the pump; said filter means disposed within the chamber in said body between the inlet passageway and the water inlet in the housing of said pump means; and said aerating means having an outlet disposed between the water outlet in the housing of said pump means and the outlet passageway in said body.

12. A system as set forth in claim 11, further comprising: said aerating means including a first tubular member disposed in fluid communication with the ambient atmosphere and a second tubular member connected to the first tubular member and disposed in fluid communication with the circulating water so that air is drawn from the atmosphere through the first and second tubular members and mixed with the circulating water.

13. A system as set forth in claim 12, further comprising: said filter means including a porous body having a material adapted to remove the solid waste from the circulating water; a porous body having a material adapted to remove carbon dioxide from the circulating water; and a porous body having a material adapted to remove ammonia from the circulating water.

* * * * *